United States Patent
Banerjee et al.

(10) Patent No.: US 10,944,305 B2
(45) Date of Patent: Mar. 9, 2021

(54) ELECTRIC DRIVE UNIT HAVING A COOLING SLEEVE

(71) Applicant: ZF Friedrichshafen AG, Friedrichshafen (DE)

(72) Inventors: Alexander Banerjee, Oberteuringen (DE); Gerhard Höring, Hagnau am Bodensee (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/334,864

(22) PCT Filed: Aug. 9, 2017

(86) PCT No.: PCT/EP2017/070149
§ 371 (c)(1),
(2) Date: Mar. 20, 2019

(87) PCT Pub. No.: WO2018/054599
PCT Pub. Date: Mar. 29, 2018

(65) Prior Publication Data
US 2019/0280553 A1 Sep. 12, 2019

(30) Foreign Application Priority Data
Sep. 21, 2016 (DE) .................. 10 2016 218 154.8

(51) Int. Cl.
*H02K 5/20* (2006.01)
*H02K 7/116* (2006.01)
(Continued)

(52) U.S. Cl.
CPC .............. *H02K 5/20* (2013.01); *H02K 7/006* (2013.01); *H02K 7/116* (2013.01); *H02K 9/19* (2013.01);
(Continued)

(58) Field of Classification Search
CPC ............ H02K 5/20; H02K 9/19; H02K 7/006; H02K 1/20; H02K 1/32; H02K 9/00;
(Continued)

(56) References Cited

U.S. PATENT DOCUMENTS 7,626,292 B2 12/2009 Baumann et al.
7,948,126 B2 5/2011 Fulton et al.
(Continued)

FOREIGN PATENT DOCUMENTS

DE 37 38 592 C1 5/1989
DE 196 28 781 A1 1/1998
(Continued)

OTHER PUBLICATIONS

Klinger et al, Transmission Device Comprising Electric Motor, Schaeffler Technologies, Jan. 17, 2013, WO 2013007399 English Machine Translation) (Year: 2013).*
(Continued)

*Primary Examiner* — Quyen P Leung
*Assistant Examiner* — Alexander A Singh
(74) *Attorney, Agent, or Firm* — Davis & Bujold PLLC; Michael J. Bujold

(57) ABSTRACT

An electric drive unit with an electric machine arranged in a motor housing. The electric machine has a rotor and a stator. A transmission is arranged in a transmission housing and driven by the electric machine. A cooling sleeve is provided, which forms a radially outward facing hollow space for a coolant by virtue of a spiral-shaped circumferential web between itself and the surrounding motor housing. Furthermore the cooling sleeve has a holding web which is designed to be clamped between two motor housing components.

11 Claims, 5 Drawing Sheets

(51) Int. Cl.
*H02K 9/19* (2006.01)
*H02K 7/00* (2006.01)
*B60K 17/04* (2006.01)

(52) U.S. Cl.
CPC ........... *B60K 17/04* (2013.01); *B60Y 2400/60* (2013.01); *H02K 2213/12* (2013.01)

(58) Field of Classification Search
CPC .. H02K 9/08; H02K 9/10; H02K 9/12; H02K 9/14; H02K 9/16; H02K 9/18; H02K 9/193; H02K 9/197; H02K 9/20; H02K 9/22; H02K 9/24; H02K 9/26; H02K 9/28; H02K 7/116; H02K 2213/12; B60K 17/04; B60Y 2400/60
USPC ........... 310/52, 54, 55, 56, 57, 58, 59, 60 R, 310/60 A, 64
See application file for complete search history.

(56) References Cited

U.S. PATENT DOCUMENTS

| | | | | |
|---|---|---|---|---|
| 2005/0151431 | A1* | 7/2005 | Cronin | H02K 9/19 |
| | | | | 310/60 A |
| 2009/0009013 | A1* | 1/2009 | Baumann | H02K 5/20 |
| | | | | 310/54 |
| 2009/0127946 | A1 | 5/2009 | Fee et al. | |
| 2010/0001597 | A1 | 1/2010 | Noll | |
| 2010/0283334 | A1 | 11/2010 | Lemmers, Jr. et al. | |
| 2015/0069862 | A1* | 3/2015 | Bulatow | H02K 5/20 |
| | | | | 310/43 |

FOREIGN PATENT DOCUMENTS

| | | | | |
|---|---|---|---|---|
| DE | 10 2005 052 364 A1 | 5/2007 | | |
| DE | 10 2008 014 386 A1 | 9/2008 | | |
| DE | 10 2008 030 524 A1 | 1/2009 | | |
| DE | 10 2011 079 157 A1 | 1/2013 | | |
| DE | 10 2011 079 162 A1 | 1/2013 | | |
| DE | 10 2012 012 798 A1 | 10/2013 | | |
| DE | 102012016208 A1 * | 2/2014 | | H02K 5/20 |
| JP | 2010206993 A * | 9/2010 | | |
| WO | WO-2013007399 A1 * | 1/2013 | | H02K 5/20 |

OTHER PUBLICATIONS

Alonso et al, Volkswagen AG, Feb. 20, 2014, DE 102012016208 (English Machine Translation) (Year: 2014).*
Ryu et al, Motor, Daikin LTD, Sep. 16, 2010, JP 2010206993 (English Machine Translation) (Year: 2010).*
German Search Report Corresponding to 10 2016 218 154.8 dated Sep. 4, 2017.
International Search Report Corresponding to PCT/EP2017/070149 dated Nov. 8, 2017.
Written Opinion Corresponding to PCT/EP2017/070149 dated Nov. 8, 2017.

* cited by examiner

ELECTRIC DRIVE UNIT HAVING A COOLING SLEEVE

This application is a National Stage completion of PCT/EP2017/070149 filed Aug. 9, 2017, which claims priority from German patent application serial no. 10 2616 218 154.8 filed Sep. 21, 2016.

FIELD OF THE INVENTION

The invention relates to an electric drive unit with an electric machine arranged in a motor housing, which machine comprises a rotor and a stator, and a transmission arranged in a transmission housing which is driven by the electric machine, as well as a cooling sleeve used in such an electric drive unit.

BACKGROUND OF THE INVENTION

From an energy and emission point of view, electric drive units have great advantages when compared with internal combustion engine drives. An electric drive unit usually consists of an electric machine, which in turn comprises a rotor and a stator, and a transmission portion which serves to convert the torque delivered by the electric machine and adapts the rotation speed of the electric machine to the driving situation of the vehicle. The rotor, stator and transmission portion have to be accommodated in a housing, which provides the necessary support for the components, ensures the functionally appropriate arrangement of the components relative to one another, provides possibilities for fitting components attached from the outside, and has the requisite suspension points for fixing to the vehicle to be driven. In addition, the housing should also assist the dissipation of heat from the thermally loaded components. For cooling, a cooling liquid is often passed through the housing when heat dissipation by convection or air-cooling are insufficient.

Such an electric drive unit is shown, for example, in DE 10 2012 102 798 A1 where an electric machine, a planetary gearset and a brake are accommodated in a housing. In that case the electric machine is cooled by means of a cooling jacket arranged between the stator of the electric machine and the inside of the housing.

When electric drive units are produced in large numbers the design and structure of the drive unit must be suitable for mass production and should also facilitate automated assembly. This must be borne in mind particularly in the design of the windings of the stator of the electric machine within the housing. In order to be able to produce these windings automatically, tool access to the winding points in the housing must be ensured.

If there are a diversity of variants of the drive unit, then in addition adaptations of the axial length in particular should be simple to generate.

SUMMARY OF THE INVENTION

Thus, the purpose of the present invention is to indicate an electric drive unit which can be cooled effectively and a cooling sleeve for it, the design of which favors automatic production and in that respect also allows for a number of variants of the drive unit.

This objective is achieved by an electric machine having the characteristics specified in the independent claims, and a cooling sleeve according to the independent claims. Design features are the object of the subordinate claims.

For the assembly of a drive unit according to the invention, the stator pack, still without windings, is first inserted into a cooling sleeve, for example press-fitted into it. The coding sleeve has an outer surface over which the cooling medium can be spirally guided around the cooling sleeve by virtue of a web in the form of a helix. The axial length of the cooling sleeve corresponds essentially to the axial length of the stator pack, so that in particular the sides of the stator pack are freely accessible for the laying of the winding loops and the wiring of the individual windings, and are not interfered with by housings. In particular with an automatically produced pull-in winding, in which automatically pre-wound coils are pulled into the stator grooves by a machine, the lateral areas of the stator must be freely accessible on the one hand for the access of the machine and on the other hand for holding the stator.

After fitting the windings into the stator pack, the cooling sleeve including the wound stator pack is inserted into the motor housing of the electric machine, so that a hollow space is formed by the helical web between the outside of the cooling sleeve and the inside of the motor housing. The hollow space is produced by the radial distance between the cooling sleeve and the inside wall of the housing, and is maintained by the circumferential spiral-shaped web. To cool the electric drive unit, a coolant flows in a spiral between the cooling sleeve and the surrounding housing wall.

In this context, the spirally encircling web of the helix can advantageously be arranged on the radially outer side of the cooling sleeve. In that way the cooling sleeve and its web can be made ready in advance and the motor housing corresponding thereto can be made simply and with high sealing ability on the inside surfaces. An alternative but also advantageous design provides that the spiral-shaped surrounding web is arranged on the radially inner side of the motor housing. For this, in a production process of the motor housing components the web can for example be milled or cast on the inside. In both alternatives a hollow space for a coolant is formed facing radially outward by the circumferential spiral web between the cooling sleeve and the surrounding motor housing.

To attach the cooling sleeve to the surrounding motor housing, the cooling sleeve has an circumferential holding web with a larger diameter. This holding web can either be arranged at one axial end of the cooling sleeve, or more advantageously as a central web in an area axially between the two ends. The holding web serves to hold the cooling sleeve and therefore also the stator onto the motor housing. At the same time, different parts of the motor housing are connected fast to one another by the holding web. In that way the cooling sleeve, including its ready-wound stator, can on the one hand be inserted into a first motor housing component and on the other hand a second motor housing component, which is connected to the housing for the transmission, can be pushed over the part of the cooling sleeve and stator projecting out of the first motor housing component and, thereafter, the two motor housing components can be connected to one another by means of the holding web of the cooling sleeve in a secure arrangement. Advantageously, in one design the transmission housing too can also be fixed together with the second motor housing component to the holding web of the cooling sleeve and the first motor housing component by means of a single connection. Ideally, the fixing in each case is done by screw connection means provided at the circumference of the holding web. The motor housing components at the same time fulfill the function of bearings for the rotor of the electric machine.

By dividing the motor housing into a plurality of components it is made easier to machine, in particular to machine accurately fitting inside surfaces and the motor housing components are more easily produced. Here, accurately machined inside surfaces in combination with cooling elements having a circumferential web to be inserted, enable a good sealing function which makes it possible to keep the coolant used within the confines of the web, and prevents undesired leakages between individual areas through which the coolant is flowing.

With the arrangement of the holding web on the cooling sleeve in an area between the two ends, an opening is preferably provided in the holding web so that the coolant liquid can flow into the spiral through the holding web from one side of the cooling sleeve to the other side of the cooling sleeve. The area at the circumference of the holding web that is not where the opening is located, serves to collect any cross-flows of the coolant that may occur, which can then be channeled through the opening. In that way the cooling sleeve with its surrounding housing is divided into two spiral-shaped cooling coils, connected to one another via the opening.

Furthermore, thanks to the holding web the cooling liquid cannot escape, in the area of the screw connection means between the motor housing components and the cooling sleeve, out of the hollow space between the motor housing components and the cooling sleeve, so that the cooling performance is ensured over the full circumference of the cooling sleeve.

Advantageously, the axial length of the electric drive device can be adapted to circumstances in which an axially longer rotor and an axially longer cooling sleeve are provided. A diversity of variants of the drive devices should be able to be covered using as many identical components as possible, so that even with longer axial lengths of the electric machine the same motor housing components can be used. To enable this, in an advantageous design a third motor housing component is provided in the electric drive unit, which comprises a first flange and a second flange positioned at the opposite end. The third motor housing component is then on the one hand attached to one of the flanges of the first or second motor housing components, and on the other hand to the other flange, to which the respective other motor housing component and the holding web of the cooling sleeve are connected. This provides adaptability to various structural requirements while to a large extent using the same components. The incorporation of a third motor housing component is also advantageous when forming common screwed connection means for joining the second motor housing component to the transmission housing. In that way, in turn, the number of connection points is reduced, in particular the number of screw connections.

BRIEF DESCRIPTION OF THE DRAWINGS

The invention will now be described in greater detail with reference to a drawing, which shows.

DETAILED DESCRIPTION OF THE PREFERRED EMBODIMENTS

Figure 1:
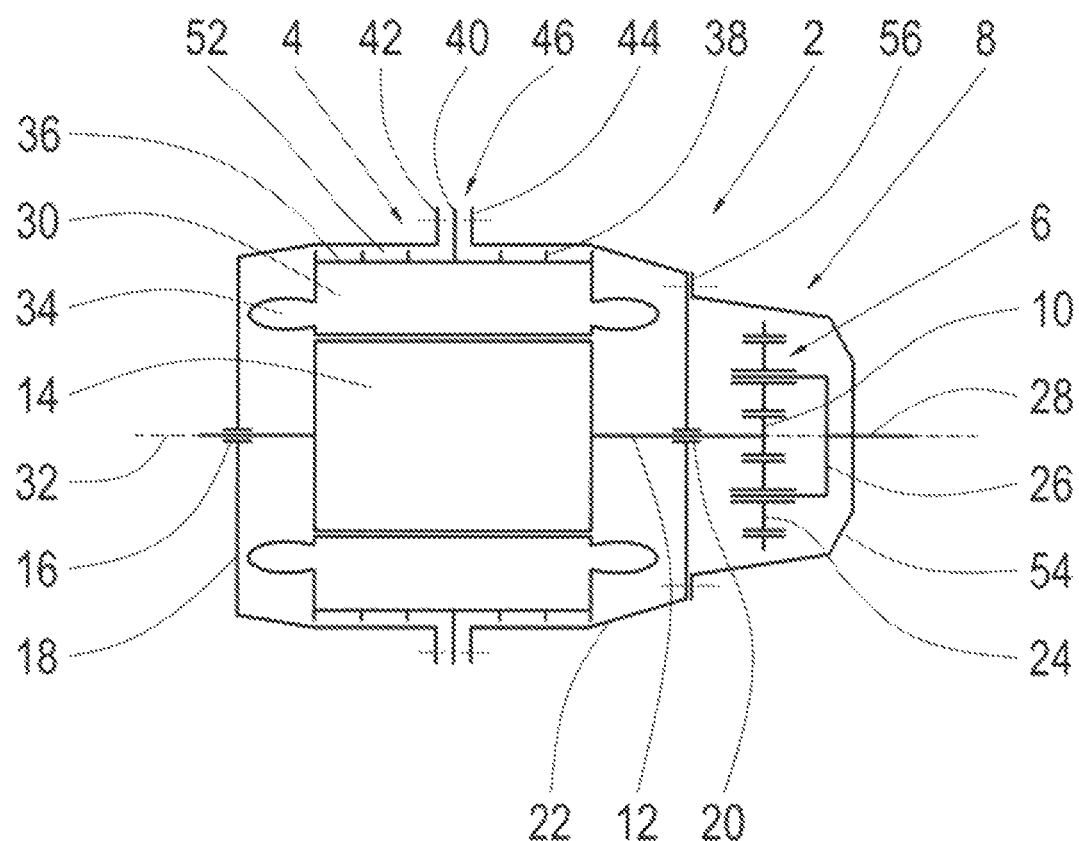
FIG. 1: A schematic representation of an electric drive unit

FIG. 1 shows a schematic representation of an electric drive unit 2, which consists of an electric machine 4 as the motor and a planetary gearset 6 as a transmission 8 connected downstream from the electric machine 4. In this case the sun gear 10 of the planetary gearset 6 is connected to the rotor shaft 12 of the electric machine 4. The rotor shaft 12 carries the rotor 14 and is on one side fitted into a bearing 16 in the first motor housing component 18. On the other side the rotor shaft 12 is fitted into the bearing 20 in the second motor housing component 22. In the planetary gearset 6 shown, the planetary gearwheels 24 are also arranged on the planetary carrier 26, which also forms the drive output shaft 28 of the electric drive unit 2 or is connected thereto.

Inside the electric machine 4, the rotor 14 rotates relative to the stator 30 about the rotation axis 32. At the axial ends of the stator 30 can be seen the winding heads 34 of the windings passing through the stator 30. Radially on the outside the stator 30 is surrounded by a cooling sleeve 36, whose axial extension is substantially the same as that of the stator 30. With its radially inner surface the cooling sleeve 36 is connected fixed to the radially outer surface of the stator 30, so that a more effective heat transfer between the stator 30 and the cooling sleeve can be achieved. On the radially outer surface of the cooling sleeve 36, a web 38 is provided which extends in a spiral circumferentially around the cooling sleeve 36. In the axially central area of the cooling sleeve a holding web 40 is provided, which has a larger radial extension than the web 38. Together with a flange 42 on the first motor housing component 18 and a flange 44 on the second motor housing component 22, the holding web 40 forms a screwed joint 46 which holds the motor housing components 18 and 22 and the cooling sleeve 36 together in a sealing manner. The screwed joint 46 also ensures that the cooling sleeve 36 is positioned securely in the motor housing.

Between the radially outer surface of the cooling sleeve 36 with its web 38 and the inside surface of the motor housing components 18 and 22, a hollow space 52 is formed into which cooling liquid for cooling the electric machine 4 is introduced. In the hollow space 52 the cooling liquid flows freely over the whole of the stator 30. The web 38 rests and forms a seal against the inside surface of the motor components 18 and 22, so that no cooling liquid can leak over the web 38 and the flushing of the entire stator 30 with cooling liquid is ensured. The transmission 8 connected downstream has a transmission housing 54, which completely surrounds the planetary gearset 6. The transmission housing 54 is attached by way of the second screwed joint to the second motor housing component 22.

Figure 2:
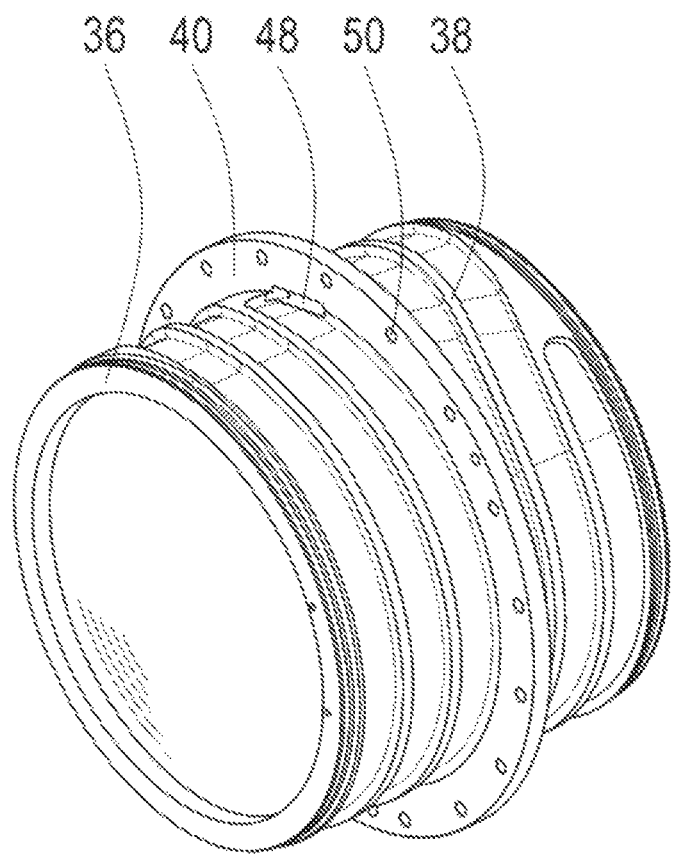
FIG. 2: A cooling sleeve

FIG. 2 shows a more exact representation of the cooling sleeve 36. The spiral-shaped circumferential web 38 can be seen on the radially outer surface, which web extends as far as an opening 48 of the holding web 40 arranged axially in the middle of the cooling sleeve 36. The holding web 40 separates the radially outer surface into two areas. The opening 48 enables the cooling liquid to pass from one area to the other area. Distributed around the circumference of the holding web 40 there are openings 50 through which screws (not shown here) can be inserted to form the screwed joint 46.

Figure 3:
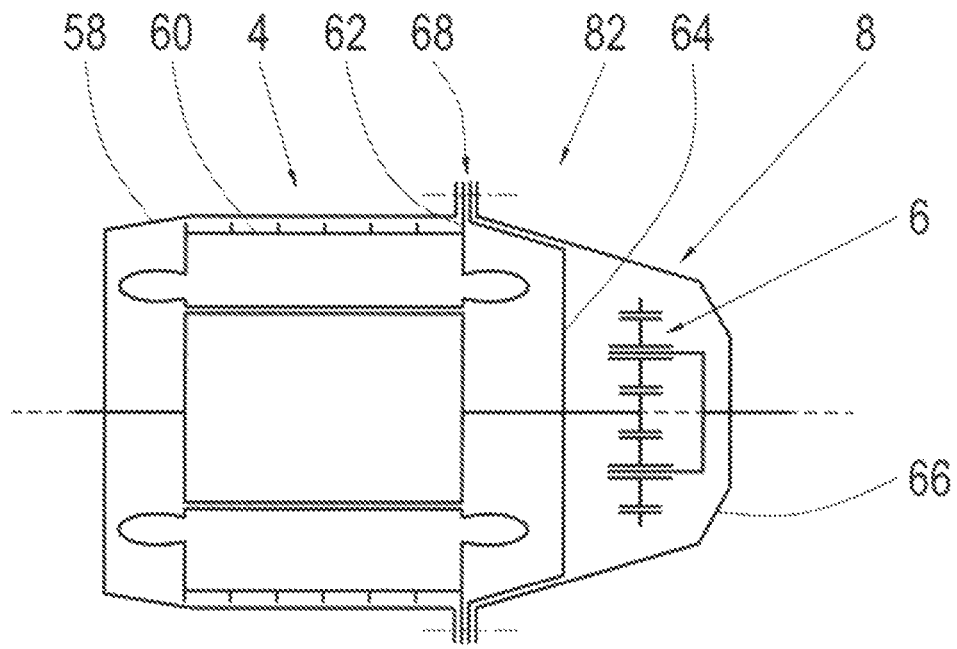
FIG. 3: A different arrangement of the cooling sleeve

FIG. 3 shows a further design of an electric drive unit 82, which compared with the arrangement in Hg. 1 has different housing components. In FIG. 3 a first motor housing component 58 covers the whole axial length of the stator 30. The cooling sleeve 60 used in this case has a holding web 62 at one of its axial ends. A second motor housing component 64 closes off the area of the electric machine 4. The planetary gearset 6 in the downstream transmission 8 is enclosed by a transmission housing 66. The transmission housing 66, the first motor housing component 58, the second housing component 64 and the holding web 62 are connected to one another by a single screwed joint. In this way the assembly process of the electric drive unit 82 can be simplified, because only the screws provided at the circumference of a single screwed joint 68 now have to be fitted.

Figure 4:
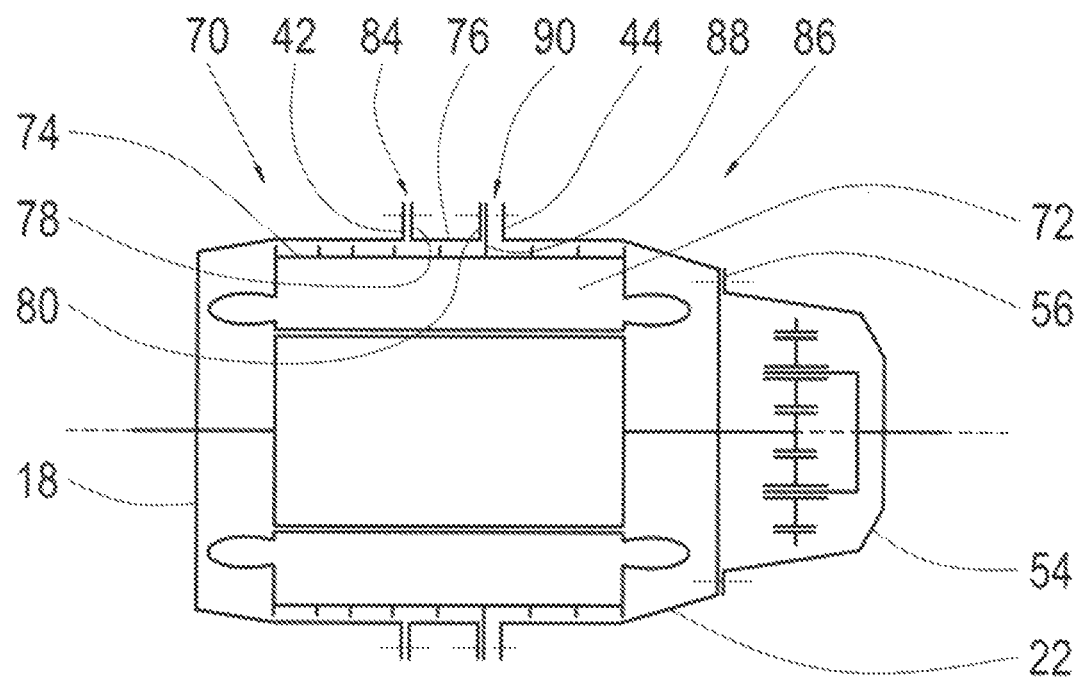
FIG. 4: An arrangement with a different stator

A further design of an electric drive unit 86 is shown in FIG. 4, in which an axially longer electric machine 70 is used in the same first motor housing component 18 as in FIG. 1. Accordingly the stator 72 of the longer electric machine 70 needs an axially longer cooling sleeve 74, which together with the stator 72 projects farther out of the first motor housing component 18. In order to be able also to use the same motor housing component 22 as in FIG. 1, and thus to be able to produce a plurality of variants of an electric drive unit using the same motor housing components 18 and 22, the axial distance forming a gap between the motor housing components must be bridged. For this a third motor housing component 76 is inserted between the first motor housing component 18 and the second motor housing component 22, and this too encloses the cooling sleeve 74. At its two axial ends the third motor housing component 76 has respective flanges 78 and 80. With the flange 42 on the first motor housing component 18, the flange 78 forms a first screwed joint 84. With the flange 44 on the second motor housing component 22 and a holding web 88 on the cooling sleeve 74, the second flange 80 forms a second screwed joint 90. As in FIG. 1 the transmission housing 54 is connected to the second motor housing component 22 by another screwed joint 56.

If with an axially longer rotor the motor housing components 58 and 64 and also the transmission housing 66 are used in an arrangement according to FIG. 3, then an axial length adaptation can also take place in accordance with FIG. 4, whereby in turn a screwed joint can be saved.

Figure 5:
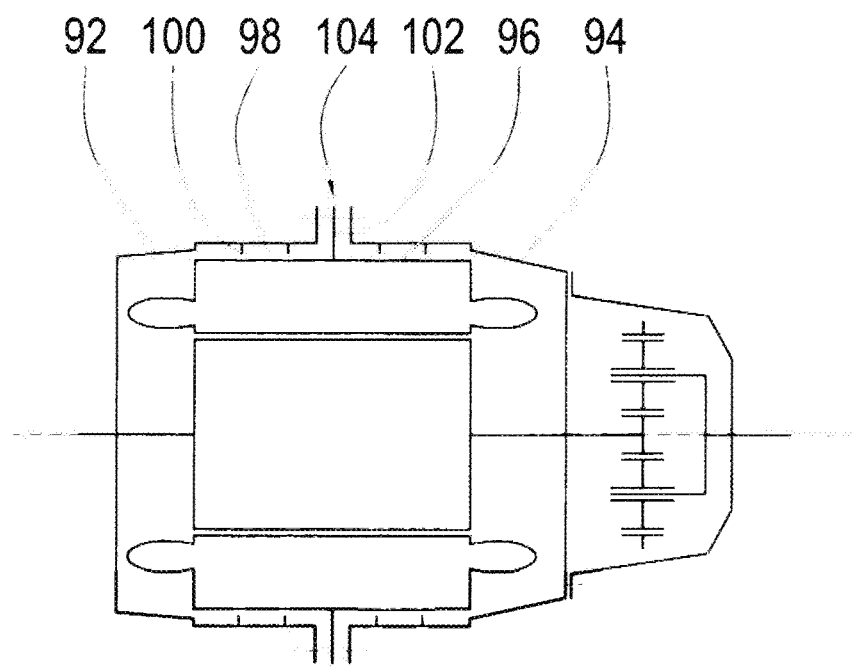
FIG. 5: An alternative arrangement according to FIG. 1

FIG. 5 shows an alternative arrangement to the representation in FIG. 1. In FIG. 5 the hollow space 98 is formed between the motor housing components 92 and 94 on the one hand and the cooling sleeve 96 on the other hand, in the same way as in FIG. 1. In this case, however, the radially surrounding web 100 is not arranged radially on the outside of the cooling sleeve 96, but rather, radially on the inside in the motor housing components 92 and 94, being for example produced by milling. In the same way as in the arrangement according to FIG. 1, here too the web 100 is in contact with and forms a seal against the cooling sleeve 96, so that coolant present in the hollow space 98 cannot leak out over the web 100 and the cooling function of the cooling spiral is ensured. Analogously with FIG. 1 on the cooling sleeve 96 a holding web 102 is provided which can be connected with the two motor housing components 92 and 94 by the screwed joint 104. Adaptations of the housing components to designs that correspond to FIGS. 3 and 4 can be done in the same way.

INDEXES

2 Electric drive unit
4 Electric machine
6 Planetary gearset
8 Transmission
10 Sun gear
12 Rotor shaft
14 Rotor
16 Bearing
18 Motor housing component
20 Bearing
22 Motor housing component
24 Planetary gearwheel
26 Planetary carrier
28 Drive output shaft
30 Stator
32 Rotation axis
34 Winding head
36 Cooling sleeve
38 Web
40 Holding web
42 Flange
44 Flange
46 Screwed joint
49 Opening
50 Opening
52 Hollow space
54 Transmission housing
56 Screwed joint
58 Motor housing component
60 Cooling sleeve
62 Holding web
64 Motor housing component
66 Transmission housing
68 Screwed joint
70 Electric machine
72 Stator
74 Cooling sleeve
76 Motor housing component
78 Flange
80 Flange
82 Electric drive unit
84 Screwed joint
86 Electric drive unit
88 Holding web
90 Screwed joint
92 Motor housing component
94 Motor housing component
96 Cooling sleeve
98 Hollow space
100 Web
102 Holding web
104 Screwed joint

The invention claimed is:
1. An electric drive unit comprising an electric machine arranged in a motor housing
the electric machine having a rotor and a stator,
a transmission being arranged in a transmission housing and driven by the electric machine,
a cooling sleeve forming a hollow space for a coolant between the cooling sleeve and the surrounding motor housing by virtue of a spiral-shaped circumferential web extending radially outward is provided,
the cooling sleeve has a holding web that extends radially outward further than the spiral-shaped circumferential web and is clamped between first and second motor housing components such that the first and the second motor housing components are completely axially spaced from each other by the holding web, an annular third motor housing component that radially encircles the cooling sleeve, comprising a first flange and a second flange arranged at axially opposite ends of the third motor housing component, the first and the second flanges of the third motor housing component extend radially outward therefrom, the first flange of the third motor housing component is fixed to the first motor housing component and the second flange of the third motor housing component is fixed to the second motor housing component and to the holding web of the cooling sleeve.

2. The electric drive unit according to claim 1, wherein the holding web of the cooling sleeve is arranged in an axially central area of the cooling sleeve.

3. The electric drive unit according to claim 1, wherein the holding web has an opening, which facilitates a flow of coolant in the hollow space from one axial side of the holding web to the other axial side of the holding web.

4. The electric drive unit according to claim 1, wherein the first and the second motor housing components and the holding web of the cooling sleeve are connected in a screwed joint by screws that extend from one of the first and the second housing components through holes in the holding web to the other of the first and the second housing components.

5. The electric drive unit according to claim 1, wherein the first and the second motor housing components the holding web of the cooling sleeve, and the transmission housing are connected to each other in a single screwed joint by screws that extend from the first housing component through the holding web and the second housing component to the transmission housing.

6. The electric drive unit according to claim 1, wherein the spiral-shaped circumferential web is formed on the cooling sleeve and extends outwards from a radially outer side of the cooling sleeve.

7. The electric drive unit according to claim 1, wherein the spiral-shaped web is formed on the first and the second motor housing components and extends radially inward from a radially inner side thereof, the spiral-shaped web contacts and forms a seal against an outside of the cooling sleeve.

8. A cooling sleeve for an electric drive unit which surrounds a stator of an electric machine in such manner that heat from the stator is transferrable to the cooling sleeve,
- a radially outer surface of the cooling sleeve has a spiral-shaped web that surrounds the cooling sleeve,
- the spiral-shaped web together with a motor housing of the electric drive unit that surrounds the cooling sleeve forms a hollow space into which cooling liquid can be introduced,
- the motor housing having a first housing component that encloses an axial end of the electric machine and a second housing component that encloses an opposite axial end of the electric machine,
- the cooling sleeve has a radially extending holding web, the first housing component mates with a first axial side of the holding web and the second housing component mates with a second axial side of the holding web such that the cooling sleeve is connected to the motor housing, and the first and the second housing components are axially separated from one another by the holding web,
- the electric drive unit has an annular third motor housing component that radially encircles the cooling sleeve, comprising a first flange and a second flange arranged at axially opposite ends of the third motor housing component, the first and the second flanges of the third motor housing component extend radially outward therefrom, the first flange of the third motor housing component is fixed to the first motor housing component and the second flange of the third motor housing component is fixed to the second motor housing component and to the holding web of the cooling sleeve.

9. The cooling sleeve according to claim 8, wherein the holding web is arranged in an axially central area of the cooling sleeve.

10. The cooling sleeve according to claim 8, wherein the holding web has an opening which enables the cooling liquid to flow along the hollow space between the first and the second axial sides of the holding web.

11. An electric drive unit comprising:
- an electric machine having a rotor and a stator and being arranged in a motor housing, the motor housing comprising at least first and second housing components;
- a transmission being driven by the electric machine and arranged in a transmission housing;
- a cooling sleeve being connected to a radially outer surface of the stator such that a hollow space is formed radially between the motor housing and an outer surface of the cooling sleeve, the outer surface of the cooling sleeve having a spiral-shaped circumferential web extending radially outward therefrom, the spiral-shaped circumferential web facilitating a flow of coolant within the hollow space circumferentially around and axially along the cooling sleeve between the cooling sleeve and the motor housing, the cooling sleeve having a holding web that extends radially from the outer surface thereof and is clamped between the first and the second housing components by screws that extend from one of the first and the second housing components through holes in the holding web to the other of the first and the second housing components to form a screwed connection; and
- an annular third motor housing component that radially encircles the cooling sleeve, comprising a first flange and a second flange arranged at axially opposite ends of the third motor housing component, the first and the second flanges of the third motor housing component extend radially outward therefrom, the first flange of the third motor housing component is fixed to the first motor housing component and the second flange of the third motor housing component is fixed to the second motor housing component and to the holding web of the cooling sleeve.

* * * * *